(12) United States Patent
Wang

(10) Patent No.: US 7,101,407 B2
(45) Date of Patent: Sep. 5, 2006

(54) SULFUR DYE PROTECTION SYSTEMS AND COMPOSITIONS AND METHODS EMPLOYING SAME

(75) Inventor: Jiping Wang, West Chester, OH (US)

(73) Assignee: The Board of Regents of the University of Nebraska, Lincoln, NE (US)

( * ) Notice: Subject to any disclaimer, the term of this patent is extended or adjusted under 35 U.S.C. 154(b) by 101 days.

(21) Appl. No.: 10/366,199

(22) Filed: Feb. 13, 2003

(65) Prior Publication Data

US 2003/0154565 A1 Aug. 21, 2003

Related U.S. Application Data

(62) Division of application No. 09/838,502, filed on Apr. 19, 2001, now abandoned.
(60) Provisional application No. 60/198,728, filed on Apr. 20, 2000, and provisional application No. 60/198,701, filed on Apr. 20, 2000.

(51) Int. Cl.
  *D06P 5/10* (2006.01)
  *D06P 1/30* (2006.01)

(52) U.S. Cl. .................. 8/442; 8/532; 8/618; 8/650; 8/652; 8/918; 8/137

(58) Field of Classification Search .................. 8/618, 8/650, 652, 137, 918, 532, 442
See application file for complete search history.

(56) References Cited

U.S. PATENT DOCUMENTS

| | | | |
|---|---|---|---|
| 647,493 A | 4/1900 | Holken | |
| 687,581 A | 11/1901 | Seidel | |
| 1,349,867 A | 8/1920 | Althouse | |
| 1,648,433 A | * 11/1927 | White | |
| 1,941,991 A | 1/1934 | Lubs et al. | |
| 1,953,908 A | 4/1934 | Lubs et al. | |
| 3,544,363 A | 12/1970 | Rath et al. | |
| 3,840,401 A | 10/1974 | Umezawa et al. | |
| 3,885,020 A | 5/1975 | Whelan | |
| 4,310,332 A | * 1/1982 | Curzons | |
| 4,439,205 A | 3/1984 | Harada et al. | |
| 4,445,901 A | 5/1984 | Beavan et al. | |
| 4,581,229 A | 4/1986 | Petrow | |
| 4,615,707 A | 10/1986 | Robinson | |
| 4,655,785 A | 4/1987 | Reinert et al. | |
| 4,707,161 A | 11/1987 | Thomas et al. | |
| 4,812,139 A | 3/1989 | Brodmann | |
| 4,831,068 A | 5/1989 | Reinert et al. | |
| 4,983,736 A | 1/1991 | Doumaux, Jr. et al. | |
| 5,013,328 A | 5/1991 | Annen et al. | |
| 5,948,122 A | 9/1999 | Xu et al. | |

FOREIGN PATENT DOCUMENTS

| | | |
|---|---|---|
| CH | 369107 | 1/1963 |
| EP | 0 710 714 A2 | 5/1996 |
| EP | 1 033 433 A2 | 9/2000 |
| GB | 403 239 | 12/1933 |
| GB | 767 897 | 2/1957 |
| GB | 1 475 971 | 6/1977 |
| JP | 1180816 | 1/1989 |
| JP | 09040528 | 2/1997 |

OTHER PUBLICATIONS

Rivlin, Joseph, The Dyeing of Textile Fibers Theory and Practice, Chapter 11, 1992, pp. 131–135.

* cited by examiner

*Primary Examiner*—Margaret Einsmann
(74) *Attorney, Agent, or Firm*—Michael Best & Friedrich LLP

(57) ABSTRACT

The present invention relates to sulfur dye protection systems and compositions and methods employing same, as well as processes for making sulfur dyes, especially bleach stable sulfur dyes, processes for dying textiles with sulfur dyes and textiles dyed by such processes. More particularly, the present invention relates to modifying existing dyes and/or making newly formed sulfur dyes. Even more particularly, the present invention relates to materials that can chemically or physically interact with sulfur dyes to protect the sulfur dyes from oxidation by oxidizing agents, such as bleaching agents.

16 Claims, No Drawings

US 7,101,407 B2

SULFUR DYE PROTECTION SYSTEMS AND COMPOSITIONS AND METHODS EMPLOYING SAME

CROSS REFERENCE TO RELATED APPLICATIONS

This application is a Divisional of U.S. Ser. No. 09/838,502, filed Apr. 19, 2001 now abandoned, which claims priority under 37 U.S.C. §119(e) to U.S. Provisional Application Ser. No. 60/198,701, filed Apr. 20, 2000 and U.S. Provisional Application Ser. No. 60/198,728, filed Apr. 20, 2000, all incorporated herein by reference.

FIELD OF THE INVENTION

The present invention relates to sulfur dye protection systems and compositions and methods employing same, as well as processes for making sulfur dyes, especially bleach stable sulfur dyes, processes for dyeing textiles with sulfur dyes and textiles dyed by such processes. More particularly, the present invention relates to modifying existing dyes and/or making newly formed sulfur dyes. Even more particularly, the present invention relates to materials that can interact (i.e., chemically or physically) with sulfur dyes to protect the sulfur dyes from oxidation by oxidizing agents, such as bleaching agents.

BACKGROUND OF THE INVENTION

Dyeing of textiles for use in garments, rugs, tapestries and the dyeing of other fibrous materials such as hair and the like has been in existence for ages. One of the most popular classes of dyes for such use has been sulfur dyes. Sulfur dyes have been and are relatively inexpensive as compared to other classes of dyes. However, in the recent years, the cost advantages of sulfur dyes has diminished such that there is no longer a large competitive edge for using sulfur dyes as compared to other classes of dyes. As a result of this diminishing of the cost advantages of sulfur dyes, the disadvantages of sulfur dyes has become more of a factor in the selection of dyes for such uses.

One of the most noticeable disadvantages associated with sulfur dyes, especially black and brown sulfur dyes, is the susceptibility of sulfur dyes to become over-oxidized by bleaching agents, such as chlorine bleaches, oxygen bleaching agents, activated oxygen bleaches and UV radiation, such as from the sun, and the like. When a sulfur dyed textile is exposed to bleaching agents, the sulfur dye has a propensity to react with the bleaching agents to be over-oxidized. As a result of the over-oxidizing of the sulfur dye, the sulfur dyed textile and/or other fibrous material begins to exhibit dye damage leading to color change.

Another problem associated with conventional sulfur dyes and textiles dyed by the conventional sulfur dyes is the problem of aging or tendering. Aging of the textiles results in large part from the fiber damage caused by sulfuric acid produced during storage and transportation of the conventional sulfur dyed textiles.

Yet another problem associated with conventional sulfur dyes and textiles dyes by the conventional sulfur dyes is the problem of the poor wash fastness.

Accordingly, there is a need to develop sulfur dye protection systems that protect sulfur dyes, especially sulfur dyes on textiles and/or other fibrous materials, from oxidation by oxidizing agents, such as bleaching agents, from tendering/aging and from reducing-color fastness environments, such as laundry wash liquor, especially bleach-containing laundry wash liquor, compositions comprising such systems, and methods for using such systems, and a need to increase the bleach stability of sulfur dyes, such as by modifying existing sulfur dyes and/or "building-into" newly formed sulfur dyes increased bleach stability properties; to dye textiles with such sulfur dyes, especially bleach stable sulfur dyes, and/or make bleach stable sulfur dyed textiles.

SUMMARY OF THE INVENTION

The present invention fulfills the needs identified above by providing sulfur dye protection systems that protect sulfur dyes, especially sulfur dyes on textiles and/or other fibrous materials, from oxidation by oxidizing agents, such as bleaching agents, compositions comprising such systems, and methods for using such systems; processes for making sulfur dyes, especially bleach stable sulfur dyes, processes for using such sulfur dyes to dye textiles and textiles dyed by such sulfur dyes. More particularly, the present invention provides a process for modifying existing dyes and/or making newly formed sulfur dyes such that the sulfur dyes exhibit increased bleach stability as compared to unmodified sulfur dyes and/or sulfur dyes that are not initially formed with the increased bleach stability properties "built-into" the sulfur dye at the time of forming the sulfur dye.

In one aspect of the present invention, a sulfur dye protection system comprising a material (i.e., a sulfur dye complexing agent) that interacts (i.e., chemically or physically), preferably chemically, with a sulfur dye, preferably a disulfide bond of the sulfur dye, such that oxidation of the sulfur dye by oxidizing agents, such as bleaching agents is inhibited and/or reduced, is provided.

In another aspect of the present invention, a composition, preferably a fabric care composition, comprising a sulfur dye protection system of the present invention is provided.

In yet another aspect of the present invention, a method for protecting sulfur dyes present on a sulfur dyed substrate, preferably a textile, from oxidation by oxidizing agents, preferably bleaching agents, comprising contacting the sulfur dyed substrate with a composition in accordance with the present invention is provided.

In still yet another aspect of the present invention, a kit comprising a sulfur dye protection system, preferably a composition comprising the sulfur dye protection system and instructions for using the sulfur dye protection system, preferably the composition, to protect sulfur dyes present on a sulfur dyed substrate, and optionally, but preferably comprising an external package containing the sulfur dye protection system, preferably the composition, and the instructions is provided.

In still yet another aspect of the present invention, a sulfur dyed substrate treated by a method of the present invention is provided.

In even yet another aspect of the present invention, a process for making sulfur dyes, especially bleach stable sulfur dyes, comprises the step of: modifying a sulfur dye in need of modification such that the modified sulfur dye exhibits increased bleach stability as compared to the unmodified sulfur dye is provided.

In still yet another aspect of the present invention, a process for making sulfur dyes, especially bleach stable sulfur dyes, comprises the steps of:

a. making a sulfur dye by reacting one or more organic compounds with a sulfur-containing compound to form the sulfur dye; and b. reacting the sulfur dye with a stabilizing agent such that the sulfur dye exhibits increased bleach stability as compared to the sulfur dye in the absence of such a stabilizing agent is provided.

In yet another aspect of the present invention, a process for dyeing a textile comprising contacting the textile with sulfur dye, especially a bleach stable sulfur dye, made by a process according to the present invention is provided.

In still another aspect of the present invention, a dyed textile made by the process for dyeing a textile according to the present invention is provided.

Accordingly, the present invention provides processes for making sulfur dyes, especially bleach stable sulfur dyes, the processes for using such sulfur dyes to dye textiles and textiles dyed by such sulfur dyes.

Accordingly, the present invention provides sulfur dye protection systems, compositions comprising such systems, methods for using such systems, kits comprising such systems, preferably compositions, and instructions for using such systems, preferably compositions, and sulfur dyed substrates treated by the method of the present invention, as well as processes for making sulfur dyes, especially bleach stable suflur dyes.

These and other aspects, objects, features and advantages will be clear from the following detailed description, examples and appended claims.

All percentages and proportions herein are by weight, and all references cited herein are hereby incorporated by reference, unless otherwise specifically indicated.

DETAILED DESCRIPTION OF THE INVENTION

Definitions

"System"—"System" as used herein means a complex unity formed of many often, but not always, diverse parts (i.e., materials, compositions, devices, appliances, procedures, methods, conditions, etc.) subject to a common plan or serving a common purpose.

"Effective Amount"—"Effective Amount" as used herein means is any amount capable of measurably inhibiting sulfur dye color change of a sulfur dyed substrate.

"Sulfur Dyed Substrates"—"Sulfur Dyed Substrates" as used herein means any textiles, fabrics, yarns and/or fibers, preferably cellulosic textiles, fabric, yarns and/or fibers.

Sulfur dyes are and have been used extensively on cellulosic textiles, fabrics, yarns and/or fibers, preferably such as cotton, rayon, ramie, jute, flax, linen, polynosic-fibers, Lyocell, poly/cotton, other cotton blends and mixtures thereof, more preferably cotton, polycotton, rayon and cotton blends.

Nonlimiting examples of products incorporating such sulfur dyed textiles, fabrics, yarns and/or fibers include garments, upholstery, drapery and carpets.

Sulfur Dye Protection Systems

In a preferred embodiment of the present invention, a sulfur dye protection system comprising a material that interacts (i.e., chemically or physically), preferably chemically, with the sulfur dye, preferably the disulfide bond of the sulfur dye, such that inhibition of the sulfur dye or parts thereof from color change caused by oxidation, such as by bleaching, is provided.

Further, it has been surprisingly found that the sulfur dyes and protection systems of the present invention provide improved aging benefits, especially on black dyes, as well as colorfastness of dyes on textiles, as compared to conventional sulfur dyes.

The materials that interact with the sulfur dye include, but are not limited to, sources of one or more metal ions. Without wishing to be bound by theory, it is believed that the one or more metal ions complexes with the sulfur-containing moiety, preferably the disulfide bond, of the sulfur dye. Further, without wishing to be bound by theory, it is believed that by forming the metal complex, the electron density on the sulfur atoms within the sulfur dye is reduced significantly because the disulfide bonds behave like electron donors in the complex. Further, without wishing to be bound by theory, it is believed that the metal complex sterically hinders the accessibility of oxidizing agents, such as bleaching agents, more preferably activated oxygen bleaches and/or oxygen bleaches, to the disulfide bonds of the sulfur dyes.

The one or more metal ions preferably comprise an electron configuration such that the one or more metal ions is at its most stable oxidation state. In other words, the metal ions cannot be oxidized by bleaching agents.

The one or more metal ions preferably comprise lanthanide metal ions, more preferably lanthanide metal ions selected from the group consisting of: La(III), Ce(IV). Gd(III) and mixtures thereof.

Alternatively, the one or more metal ions may comprise a transition metal ion, preferably a transition metal ion selected from the group consisting of: Ni(II), Co(II), Pd(II), Pt(II), Sn(IV), Pb(II), Hg(II) and mixtures thereof.

Nonlimiting examples of sources of the one or more metal ions are lanthanide metal salts, such as lanthanum (III) sulfate, cerium (IV) sulfate and gadolinium (III) sulfate, chloride, and transition metal salts.

Sulfur Dye Protection System-containing Compositions

In another preferred embodiment of the present invention, a composition, preferably a fabric care composition, comprising a sulfur dye protection system of the present invention is provided.

Forms of Compositions

The present invention relates to pre-soak, pre-treat, through-the-wash, through-the-rinse, textile mill finishing compositions, textile mill dyeing compositions and post-treat compositions. The compositions of the present invention may be used in finishing and/or dyeing processes especially for textiles, textile and/or garment treating processes, such as laundering, and/or pre-treat and post-treat processes where a finished textile and/or garment is treated to impart a benefit. The compositions of the present invention provide increased color fidelity benefits, such as reduced color fading, reduced dye transfer, color protection even in the presence of oxygen bleaching agents, reduced crocking, and/or reduced sun fading, to sulfur dyed substrates.

The compositions may take any form, for example, solid (powder, granules, bars, tablets), dimple tablets, liquids, paste, gel, spray, stick, foam, thixotropic liquids, preferably the compositions take the form of liquids.

The liquid forms can also be in a "concentrated" form which are diluted to form compositions with the usage concentrations, as given hereinbelow, for use in the "usage conditions". Concentrated compositions (i.e., compositions where the water content is less than 40%, more preferably less than 30%, most preferably less than 20% by weight of the compositions) comprise a higher level of sulfur dye protection systems, typically from about 1% to about 99%, preferably from about 2% to about 65%, more preferably from about 3% to about 25%, by weight of the concentrated fabric care composition. Concentrated compositions are used in order to provide a less expensive product. When a concentrated product is used, i.e., when the sulfur dye protection system is from about 1% to about 99%, by weight of the concentrated composition, it is preferable to dilute the composition, preferably with water, before treating a sulfur dyed substrate in need of treatment with such a concentrated composition.

The present invention also relates to compositions of the present invention incorporated into a spray dispenser to create an article of manufacture that can facilitate treatment of sulfur dyed substrates with said compositions at a level that is effective, yet is not discernible when dried on the surfaces. The spray dispenser comprises manually activated and non-manual powered (operated) spray means and a container containing the composition. The articles of manufacture preferably are in association with instructions for use to ensure that the consumer applies sufficient composition to provide the desired benefit.

The compositions of the present invention can be incorporated into a spray dispenser, or concentrated stick form that can create an article of manufacture that can facilitate the cleaning and/or fabric care or conditioning of fabric.

The spray-treatment compositions herein are typically packaged in spray dispensers. The spray dispensers can be any of the manually activated means for producing a spray of liquid droplets as is known in the art, e.g. trigger-type, pump-type, non-aerosol self-pressurized, and aerosol-type spray means. It is preferred that at least about 70%, more preferably, at least about 80%, most preferably at least about 90% of the droplets have a particle size of smaller than about 200 microns.

The spray dispenser can be an aerosol dispenser. Said aerosol dispenser comprises a container which can be constructed of any of the conventional materials employed in fabricating aerosol containers. The dispenser must be capable of withstanding internal pressure in the range of from about 20 to about 110 p.s.i.g., more preferably from about 20 to about 70 p.s.i.g. The one important requirement concerning the dispenser is that it be provided with a valve member which will permit the fabric care compositions of the present invention contained in the dispenser to be dispensed in the form of a spray of very fine, or finely divided, particles or droplets. A more complete description of commercially available suitable aerosol spray dispensers appears in U.S. Pat. No. 3,436,772, Stebbins, issued Apr. 8, 1969; and U.S. Pat. No. 3,600,325, Kaufman et al., issued Aug. 17, 1971.

Preferably the spray dispenser is a self-pressurized non-aerosol container having a convoluted liner and an elastomeric sleeve. A more complete description of suitable self-pressurized spray dispensers can be found in U.S. Pat. No. 5,111,971, Winer, issued May 12, 1992, and U.S. Pat. No. 5,232,126, Winer, issued Aug. 3, 1993. Another type of suitable aerosol spray dispenser is one wherein a barrier separates the wrinkle reducing composition from the propellant (preferably compressed air or nitrogen), as is disclosed in U.S. Pat. No. 4,260,110, issued Apr. 7, 1981, incorporated herein by reference. Such a dispenser is available from EP Spray Systems, East Hanover, N.J.

More preferably, the spray dispenser is a non-aerosol, manually activated, pump-spray dispenser. A more complete disclosure of commercially available suitable dispensing devices appears in: U.S. Pat. No. 4,895,279, Schultz, issued Jan. 23, 1990; U.S. Pat. No. 4,735,347, Schultz et al., issued Apr. 5, 1988; and U.S. Pat. No. 4,274,560, Carter, issued Jun. 23, 1981.

Most preferably, the spray dispenser is a manually activated trigger-spray dispenser. A more complete disclosure of commercially available suitable dispensing devices appears in U.S. Pat. No. 4,082,223, Nozawa, issued Apr. 4, 1978; U.S. Pat. No. 4,161,288, McKinney, issued Jul. 7, 1985; U.S. Pat. No. 4,434,917, Saito et al., issued Mar. 6, 1984; and U.S. Pat. No. 4,819,835, Tasaki, issued Apr. 11, 1989; U.S. Pat. No. 5,303,867, Peterson, issued Apr. 19, 1994.

A broad array of trigger sprayers or finger pump sprayers are suitable for use with the compositions of this invention. These are readily available from suppliers such as Calmar, Inc., City of Industry, Calif. CSI (Continental Sprayers, Inc.), St. Peters, Mo.; Berry Plastics Corp., Evansville, Ind.—a distributor of Guala® sprayers: or Seaquest Dispensing, Cary, Ill.

The preferred trigger sprayers are the blue inserted Guala® sprayer, available from Berry Plastics Corp., the Calmar TS800-1A® sprayers, available from Calmar Inc., or the CSI T7500® available from Continental Sprayers Inc., because of the fine uniform spray characteristics, spray volume and pattern size. Any suitable bottle or container can be used with the trigger sprayer, the preferred bottle is a 17 fl-oz. bottle (about 500 ml) of good ergonomics similar in shape to the Cinch® bottle. It can be made of any materials such as high density polyethylene, polypropylene, polyvinyl chloride, polystyrene, polyethylene terephthalate, glass or any other material that forms bottles. Preferably, it is made of high density polyethylene or polyethylene terephthalate.

For smaller four fl-oz size (about 118 ml), a finger pump can be used with canister or cylindrical bottle. The preferred pump for this application is the cylindrical Euromist II® from Seaquest Dispensing.

It has been found that sulfur dye protection systems of the present invention impart to the fabric improved color appearance and/or color fastness.

Types of Fabric Care Compositions a. Finishing and/or Dyeing Compositions

Compositions of the present invention can be used in dyeing processes and/or other finishing processes that typically occur in a textile mill. Such industrial compositions typically comprise a level of sulfur dye protection system, preferably one or more metal ions in accordance with the present invention, of from about 0.1% to about 50%, preferably from about 0.1% to about 30%, more preferably from about 0.5% to about 20%, by weight of the dyeing compositions and optionally, but preferably, one or more adjunct ingredients.

Those of ordinary skill in the art know that textile mills conventionally use two types of methods to apply sulfur dyes to textiles, fabrics and/or fibers.

One method is the exhaust method or batch method. In the exhaust dyeing method, the soluble sulfur dye is applied via a dye bath which typically contains the sulfur dyes, which may be in their water-insoluble form or in their pre-reduced (leuco) form (water-soluble form), a reducing agent (even if the sulfur dyes are in their pre-reduced form to ensure a reducing environment in the dye bath), such as sodium sulfide and other suitable ingredients. To this dyebath is added the textile, fabric, yarn and/or fibers to be dyed. After dyeing but before oxidizing the water-soluble form of the sulfur dye to its water-insoluble form, the dyed textiles, fabrics, yarns and/or fibers are rinsed well with warm and hot water. Finally, an oxidizing agent, such as sodium bromate is added to an aqueous solution containing the dyed textiles, fabrics, yarns and/or fibers to oxidize the water-soluble form of the sulfur dye to the water-insoluble form. Then the sulfur dyed textiles/fabrics, yarns and/or fibers are rinsed and/or soaped and/or dried. The exhaust method is more fully described in the following literature references: Tobin H, American Dyestuff Reporte, 68, p. 26, 1979; Leon Tigler, Textile Chemist & Colourists, Vol. 12, No. 6, p. 43, 1980; and Sulfur Dyes, Martin Marietta Chemicals, Sodyeco Division, 2/80-LT.

The other method is the continuous method. In the continuous method, the sulfur dyes are applied to textiles, fabrics, yarns and/or fibers continously by the pad/steam method which consists of the following steps: pad; steam; rinse; oxidize; and rinse. The pad step comprises a padding bath which contains the sulfur dye, which may be in their water-insoluble form or in their pre-reduced (leuco) form (water-soluble form), a reducing agent (even if the sulfur dyes are in their pre-reduced form to ensure a reducing environment in the dye bath), such as sodium sulfide and other suitable ingredients. The steam step comprises passing the sulfur dyed textiles, fabrics, yarns and/or fibers through a steamer filled with steam to obtain an oxygen-free atmosphere. Next the sulfur dyed substrate is rinsed with warm and hot water. Then the sulfur dyed substrate is oxidized by an oxidizing agent, such as sodium bromate. Finally, the sulfur dyed substrate is rinsed again. The continuous method is more fully described in the following literature references: Leon Tigler, Textile Chemist & Colourists, Vol. 12, No. 6, p. 43, 1980; and Sulfur Dyes, Martin Marietta Chemicals, Sodyeco Division, 2/80-LT; and Tom Burns, Efficient Pad Steam of Sulfur Colors, Sandoz Chem. Corp., Dec. 1, 1987.

The finishing and/or dyeing compositions of the present invention are typically applied to the dyed substrate before, along with or after applying the oxidizing agent.

b. Laundering Compositions

For wash-added and rinse-added methods, the article of manufacture can simply comprise a liquid or granular solid composition and a suitable container.

Wash-added compositions, including liquid and granular detergent compositions and wash additive compositions typically comprise a level of sulfur dye protection system, preferably one or more metal ions in accordance with the present invention, of from about 0.1% to about 40%, preferably from about 0.5% to about 30%, more preferably from about 1% to about 20%, by weight of the wash added compositions and optionally, but preferably one or more adjunct ingredients.

Preferably the in-use levels of the sulfur dye protection system, preferably one or more metal ions in accordance with the present invention, present in an aqueous wash solution comprising the wash-added compositions of the present invention are from about 1 ppm to about 400 ppm, more preferably from about 5 ppm to about 300 ppm, most preferably from about 10 ppm to about 200 ppm.

Typical rinse-added compositions, including liquid fabric conditioning compositions and/or other rinse additive compositions, contain a level of sulfur dye protection system preferably one or more metal ions in accordance with the present invention, of from about 0.1% to about 80%, preferably from about 0.5% to about 50%, more preferably from about 1% to about 30%, by weight of the rinse-added compositions and optionally, but preferably one or more adjunct ingredients.

Preferably the in-use levels of the sulfur dye protection system, preferably one or more metal ions in accordance with the present invention, present in an aqueous rinse solution comprising the wash-added compositions of the present invention are from about 0.5 ppm to about 400 ppm, more preferably from about 2.5 ppm to about 250 ppm, most preferably from about 5 ppm to about 150 ppm.

Preferably the articles of manufacture in accordance with the present invention are in association with instructions for how to use the composition to treat sulfur dyed substrates, especially textiles and/or garments and/or fabrics correctly, to obtain the desirable results, for example, improved color appearance including, e.g., the manner and/or amount of composition to be used. It is important that the instructions be as simple and clear as possible. Accordingly, the use of pictures and/or icons to assist in explaining the instructions is desirable.

Compositions of the present invention for fabric care in a wash cycle in accordance with the present invention comprise an effective amount of a sulfur dye protection system of the present invention, and optionally, surfactants, builders, perfume, chlorine scavenging agents, dye transfer inhibiting agents, dye fixative agents, dispersants, enzymes, heavy metal chelating agents, suds suppressors, fabric softener actives, chemical stabilizers including antioxidants, silicones, antimicrobial actives and/or preservatives, soil suspending agents, soil release agents, optical brighteners, colorants, and the like, or mixtures thereof. Again, the composition is preferably packaged in association with instructions for use to ensure that the consumer knows what benefits can be achieved.

Compositions of the present invention for fabric care in a rinse step in accordance with the present invention comprise an effective amount of a sulfur dye protection system of the present invention, and optionally, fabric softener actives, perfume, electrolytes, chlorine scavenging agents, dye transfer inhibiting agents, dye fixative agents, phase stabilizers, chemical stabilizers including antioxidants, silicones, antimicrobial actives and/or preservatives, chelating agents, aminocarboxylate chelating agents, colorants, enzymes, brighteners, soil release agents, anti-encrustation agents, builders and/or mixtures thereof. Again, the composition is preferably packaged in association with instructions for use to ensure that the consumer knows what benefits can be achieved.

A preferred composition of the present invention for fabric care comprises an effective amount of a sulfur dye protection system in accordance with the present invention, and optionally, perfume, fabric lubricants, adjunct fabric shape retention polymers, lithium salts, hydrophilic plasticizers, odor control agents, antimicrobial actives and/or preservatives, surfactants, enzymes, or mixtures thereof. Other optional ingredients can also be added, e.g., antioxidants, chelating agents, e.g., aminocarboxylate chelating agents, heavy metal chelating agents, antistatic agents, insect and moth repelling agents, dye transfer inhibiting agents, dye fixative agents, colorants, suds suppressors, and the like, and mixtures thereof. The composition is typically applied to fabric via a, e.g., dipping, soaking and/or spraying process followed by a drying step, including the process comprising a step of fabric care or spraying the fabric with the fabric care composition either outside or inside an automatic clothes dryer followed by, or concurrently with, the drying step in said clothes dryer. However, the composition may be applied by spraying the fabric with the fabric care composition prior to and/or during ironing, if needed. Also, the composition may be applied by spraying the fabric during dry cleaning. The application can be done industrially by large scale processes on textiles and/or finished garments and clothings, or in a consumer's home by the use of commercial product.

The compositions, especially fabric care compositions herein can be made by any suitable process known in the art. Examples of such processes are described in U.S. Pat. No. 5,576,282.

The compositions herein will preferably be formulated such that, during use in aqueous cleaning operations, the wash water will have a pH of between about 6.5 and about 11, preferably between about 7.5 and 11. Techniques for controlling pH at recommended usage levels include the use of buffers, alkalis, acids, etc., and are well known to those skilled in the art.

Another appropriate form in which the compositions of the present invention may be incorporated are tablets. Such composition tablets comprise an effective amount of a sulfur dye protection system in accordance with the present invention, and optionally, surfactants, builders, perfume, chlorine scavenging agents, dye transfer inhibiting agents, dye fixative agents, dispersants, enzymes, heavy metal chelating agents, suds suppressors, fabric softener actives, chemical stabilizers including antioxidants, silicones, antimicrobial actives and/or preservatives, soil suspending agents, soil release agents, optical brighteners, colorants, and the like, or mixtures thereof. Again, the composition is preferably packaged in association with instructions for use to ensure that the consumer knows what benefits can be achieved. The tablets can be used in pre-wash and/or pre-treatment procedures as well as through the wash and/or rinse cycles.

c. Pre-Treat and/or Post-treat Compositions

Pre-treat and/or Post-treat compositions in accordance with the present invention, which preferably are applied to fabrics in need of treatment by soaking, foaming, spraying, dipping and/or rubbing (i.e., a stick form) preferably comprise a level of sulfur dye protection system, preferably one or more metal ions in accordance with the present invention, of from about 0.1% to about 50%, preferably from about 0.1% to about 30%, more preferably from about 0.5% to about 20%, by weight of the composition and optionally, but preferably one or more adjunct ingredients.

Adjunct Materials

In addition to the sulfur dye protection system, one or more adjunct ingredients may optionally, but preferably, be included in the compositions, products and/or systems comprising the sulfur dye protection system.

Examples of suitable adjunct materials include, but are not limited to, conventional surfactants, builders, bleaches, bleach activators, bleach catalysts, enzymes, enzyme stabilizing systems, chelants, optical brighteners, soil release polymers, dye transfer agents, dispersants, suds suppressors, dyes, perfumes, finishing agents, textile milling agents, solvents, organic acids, colorants, filler salts, hydrotropes, photoactivators, fluorescers, fabric conditioners, hydrolyzable surfactants, perservatives, anti-oxidants, anti-shrinkage agents, anti-wrinkle agents, germicides, fungicides, alkalinity sources, solubilizing agents, carriers, processing aids, pigments and pH control agents as described in U.S. Pat. Nos. 5,705,464, 5,710,115, 5,698,504, 5,695,679, 5,686,014, 4,447,242, 5,385,680, 5,912,078, 5,725,951, 3,713,878, 3,649,344 and 5,646,101.

Surfactants—A wide range of surfactants can be used in the compositions of the present invention.

Surfactants included in the fully-formulated compositions afforded by the present invention comprise at least 0.01%, preferably at least about 0.1%, more preferably at least about 0.5%, even more preferably at least about 1%, most preferably at least about 3% to about 80%, more preferably to about 60%, most preferably to about 50% by weight of composition depending upon the particular surfactants used and the desired effects to be achieved.

The surfactant can be nonionic, anionic, amphoteric, amphophilic, zwitterionic, cationic, semi-polar nonionic, and mixtures thereof, nonlimiting examples of which are disclosed in U.S. Pat. Nos. 5,707,950 and 5,576,282. A typical listing of anionic, nonionic, amphoteric and zwitterionic classes, and species of these surfactants, is given in U.S. Pat. No. 3,664,961 issued to Norris on May 23, 1972. Preferred compositions comprise nonionic surfactants and/or mixtures of nonionic surfactants with other surfactants, especially anionic surfactants.

Nonlimiting examples of surfactants useful herein include the conventional alkyl ethoxylates, alkyl alkoxy sulfates, alkyl sulfates, linear alkyl benzene sulfonates, amine oxides, alkyl polyglycosides, and more particularly, $C_8$–$C_{18}$ alkyl ethoxylates ("AE"), with EO about 1–22, including the so-called narrow peaked alkyl ethoxylates and $C_6$–$C_{12}$ alkyl phenol alkoxylates (especially ethoxylates and mixed ethoxy/propoxy), alkyl dialkyl amine oxide, alkanoyl glucose amide. $C_{11}$–$C_{18}$ alkyl benzene sulfonates and primary, secondary and random alkyl sulfates, the $C_{10}$–$C_{18}$ alkyl alkoxy sulfates, the $C_{10}$–$C_{18}$ alkyl polyglycosides and their corresponding sulfated polyglycosides, $C_{12}$–$C_{18}$ alpha-sulfonated fatty acid esters, $C_{12}$–$C_{18}$ alkyl and alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like. Other conventional useful surfactants are listed in standard texts.

Electrolytes—The compositions may also optionally comprise one or more electrolytes. When present, the one or more electrolytes will be present in the compositions at a level of from 0% to about 10%, more preferably from about 1% to about 8%, even more preferably from about 2% to about 6%, of a suitable electrolyte or acid equivalent thereof. Sodium citrate is a highly preferred electrolyte for use herein.

The compositions herein may optionally contain from about 0% to about 10%, by weight, of solvents and hydrotropes. Without being limited by theory, it is believed that the presence of solvents and hydrotropes can affect the structured versus isotropic nature of the compositions; By "solvent" is meant the commonly used solvents in the detergent industry, including alkyl monoalcohol, di-, and tri-alcohols, ethylene glycol, propylene glycol, propanediol, ethanediol, glycerine, etc. By "hydrotrope" is meant the commonly used hydrotropes in the detergent industry, including short chain surfactants that help solubilize other surfactants. Other examples of hydrotropes include cumene, xylene, or toluene sulfonate, urea, $C_8$ or shorter chain alkyl carboxylates, and $C_8$ or shorter chain alkyl sulfate and ethoxylated sulfates.

Bleaching System—The compositions of the present invention may comprise a bleaching system. Bleaching systems typically comprise a "bleaching agent" (source of hydrogen peroxide) and an "initiator" or "catalyst". When present, bleaching agents will typically be at levels of from about 1%, preferably from about 5% to about 30%, preferably to about 20% by weight of the composition. If present, the amount of bleach activator will typically be from about 0.1%, preferably from about 0.5% to about 60%, preferably to about 40% by weight, of the bleaching composition comprising the bleaching agent-plus-bleach activator.

Bleaching Agents—Hydrogen peroxide sources are described in detail in the herein incorporated Kirk Othmer's Encyclopedia of Chemical Technology, 4th Ed (1992, John Wiley & Sons), Vol. 4, pp. 271–300 "Bleaching Agents (Survey)", and include the various forms of sodium perborate and sodium percarbonate, including various coated and modified forms.

The preferred source of hydrogen peroxide used herein can be any convenient source, including hydrogen peroxide itself. For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Also useful are sources of available oxygen such as persulfate bleach (e.g., OXONE, manufactured by DuPont). Sodium perborate monohydrate and sodium percarbonate are particularly preferred. Mixtures of any convenient hydrogen peroxide sources can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1.250 micrometers. Optionally, the percarbonate can be coated with a silicate, borate or water-soluble surfactants. Percarbonate is available from various commercial sources such as FMC, Solvay and Tokai Denka.

Compositions of the present invention may also comprise as the bleaching agent a chlorine-type bleaching material. Such agents are well known in the art, and include for example sodium dichloroisocyanurate ("NaDCC"). However, chlorine-type bleaches are less preferred for compositions which comprise enzymes.

(a) Bleach Activators—Preferably, the peroxygen bleach component in the composition is formulated with an activator (peracid precursor). The activator is present at levels of from about 0.01%, preferably from about 0.5%, more preferably from about 1% to about 15%, preferably to about 10%, more preferably to about 8%, by weight of the composition. Preferred activators are selected from the group consisting of tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzenesulphonate (NOBS), phenyl benzoate (PhBz), decanoyloxybenzenesulphonate (C10-OBS), benzoylvalerolactam (BZVL), octanoyloxybenzenesulphonate ($C_8$-OBS), perhydrolyzable esters and mixtures thereof, most preferably benzoylcaprolactam and benzoylvalerolactam. Particularly preferred bleach activators in the pH range from about 8 to about 9.5 are those selected having an OBS or VL leaving group.

Preferred hydrophobic bleach activators include, but are not limited to, nonanoyloxybenzenesulphonate (NOBS), 4-[N-(nonaoyl) amino hexanoyloxy]-benzene sulfonate sodium salt (NACA-OBS) an example of which is described in U.S. Pat. No. 5,523,434, dodecanoyloxybenzenesulphonate (LOBS or $C_{12}$-OBS). 10-undecenoyloxybenzenesulfonate (UDOBS or $C_{11}$-OBS with unsaturation in the 10 position), and decanoyloxybenzoic acid (DOBA).

Preferred bleach activators are those described in U.S. Pat. No. 5,698,504 Christie et al., issued Dec. 16, 1997; U.S. Pat. No. 5,695,679 Christie et al. issued Dec. 9, 1997: U.S. Pat. No. 5,686,401 Willey et al., issued Nov. 11, 1997; U.S. Pat. No. 5,686,014 Hartshorn et al. issued Nov. 11, 1997; U.S. Pat. No. 5,405,412 Willey et al., issued Apr. 11, 1995; U.S. 5,405,413 Willey et al., issued Apr. 11, 1995; U.S. Pat. No. 5,130,045 Mitchel et al., issued Jul. 14, 1992; and U.S. Pat. No. 4,412,934 Chung et al., issued Nov. 1, 1983, and copending patent applications U.S. Ser. Nos. 08/709,072, 08/064,564, all of which are incorporated herein by reference.

The mole ratio of peroxygen bleaching compound (as AvO) to bleach activator in the present invention generally ranges from at least 1:1, preferably from about 20:1, more preferably from about 10:1 to about 1:1, preferably to about 3:1.

Quaternary substituted bleach activators may also be included. The present laundry compositions preferably comprise a quaternary substituted bleach activator (QSBA) or a quaternary substituted peracid (QSP); more preferably, the former. Preferred QSBA structures are further described in U.S. Pat. No. 5,686,015 Willey et al., issued Nov. 11, 1997; U.S. Pat. No. 5,654,421 Taylor et al. issued Aug. 5, 1997; U.S. Pat. No. 5,460,747 Gosselink et al., issued Oct. 24, 1995; U.S. Pat. No. 5,584,888 Miracle et al. issued Dec. 17, 1996; and U.S. Pat. No. 5,578,136 Taylor et al., issued Nov. 26, 1996; all of which are incorporated herein by reference.

Highly preferred bleach activators useful herein are amide-substituted as described in U.S. Pat. Nos. 5,698,504, 5,695,679, and U.S. Pat. No. 5,686,014 each of which are cited herein above. Preferred examples of such bleach activators include: (6-octanamidocaproyl) oxybenzenesulfonate,(6-nonanamidocaproyl) oxybenzenesulfonate, (6-decanamidocaproyl) oxybenzenesulfonate and mixtures thereof.

Other useful activators, disclosed in U.S. Pat. Nos. 5,698,504, 5,695,679, 5,686,014 each of which is cited herein above and U.S. Pat. No. 4,966,723 Hodge et al., issued Oct. 30, 1990, include benzoxazin-type activators, such as a $C_6H_4$ ring to which is fused in the 1,2-positions a moiety —C(O)OC($R^1$)=N—.

Depending on the activator and precise application, good bleaching results can be obtained from bleaching systems having with in-use pH of from about 6 to about 13, preferably from about 9.0 to about 10.5. Typically, for example, activators with electron-withdrawing moieties are used for near-neutral or sub-neutral pH ranges. Alkalis and buffering agents can be used to secure such pH.

Acyl lactam activators, as described in U.S. Pat. Nos. 5,698,504, 5,695,679 and 5,686,014, each of which is cited herein above, are very useful herein, especially the acyl caprolactams (see for example WO 94-28102 A) and acyl valerolactams (see U.S. Pat. No. 5,503,639 Willey et al., issued Apr. 2, 1996 incorporated herein by reference).

(b) Organic Peroxides, especially Diacyl Peroxides—These are extensively illustrated in Kirk Othmer, Encyclopedia of Chemical Technology, Vol. 17, John Wiley and Sons, 1982 at pages 27–90 and especially at pages 63–72, all incorporated herein by reference. If a diacyl peroxide is used, it will preferably be one which exerts minimal adverse impact on spotting/filming.

(c) Metal-containing Bleach Catalysts—The present invention compositions and methods may utilize metal-containing bleach catalysts that are effective for use in bleaching compositions. Preferred are manganese and cobalt-containing bleach catalysts.

One type of metal-containing bleach catalyst is a catalyst system comprising a transition metal cation of defined bleach catalytic activity, such as copper, iron, titanium, ruthenium tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243 Bragg, issued Feb. 2, 1982.

Manganese Metal Complexes—If desired, the compositions herein can be catalyzed by means of a manganese compound. Such compounds and levels of use are well known in the art and include, for example, the manganese-based catalysts disclosed in U.S. Pat. Nos. 5,576,282; 5,246,621; 5,244,594; 5,194,416; and 5,114,606; and European Pat. App. Pub. Nos. 549,271 A1, 549,272 A1, 544,440 A2, and 544,490 A1; Preferred examples of these catalysts include $Mn^{IV}_2(u-O)_3(1,4,7\text{-trimethyl-}1,4,7\text{-triazacyclononane})_2(PF_6)_2$. $Mn^{III}_2(u-O)_1(u-OAc)_2(1,4,7\text{-trimethyl-}1,4,7\text{-triazacyclononane})_2(ClO_4)_2$, $Mn^{IV}_4(u-O)_6(1,4,7\text{-triazacyclononane})_4(ClO_4)_4$, $Mn^{III}Mn^{IV}_4(u-O)_1(u-OAc)_2$-$(1,4,7\text{-trimethyl-}1,4,7\text{-triazacyclononane})_2(ClO_4)_3$, $Mn^{IV}(1,4,7\text{-trimethyl-}1,4,7\text{-triazacyclononane})\text{-}(OCH_3)_3 (PF_6)$, and mixtures thereof. Other metal-based bleach catalysts include those disclosed in U.S. Pat. Nos. 4,430,243 and 5,114,611. The use of manganese with various complex ligands to enhance bleaching is also reported in the following: U.S. Pat. Nos. 4,728,455; 5,284,944; 5,246,612; 5,256,779; 5,280,117; 5,274,147; 5,153,161; and 5,227,084.

Cobalt Metal Complexes—Cobalt bleach catalysts useful herein are known, and are described, for example, in U.S. Pat. Nos. 5,597,936; 5,595,967; and 5,703,030; and M. L. Tobe. "Base Hydrolysis of Transition-Metal Complexes", *Adv. Inorg. Bioinorg. Mech.*, (1983). 2, pages 1–94. The most preferred cobalt catalyst useful herein are cobalt pentaamine acetate salts having the formula $[Co(NH_3)_5OAc]T_y$, wherein "OAc" represents an acetate moiety and "$T_y$" is an anion, and especially cobalt pentaamine acetate chloride. $[Co(NH_3)_5OAc]Cl_2$; as well as $[Co(NH_3)_5OAc](OAc)_2$; $[Co(NH_3)_5OAc](PF_6)_2$; $[Co(NH_3)_5OAc](SO_4)$; $[Co(NH_3)_5OAc](BF_4)_2$; and $[Co(NH_3)_5OAc](NO_3)_2$ (herein "PAC").

These cobalt catalysts are readily prepared by known procedures, such as taught for example in U.S. Pat. Nos. 5,597,936; 5,595,967; and 5,703,030; in the Tobe article and the references cited therein; and in U.S. Pat. No. 4,810,410; *J. Chem. Ed.* (1989), 66 (12), 1043–45; The Synthesis and Characterization of Inorganic Compounds, W. L. Jolly (Prentice-Hall; 1970), pp. 461–3; *Inorg. Chem.*, 18, 1497–1502 (1979); *Inorg. Chem.*, 21, 2881–2885 (1982); *Inorg. Chem.*, 18, 2023–2025 (1979); Inorg. Synthesis, 173–176 (1960) and *Journal of Physical Chemistry*, 56, 22–25 (1952).

Transition Metal Complexes of Macropolycyclic Rigid Ligands—Compositions herein may also suitably include as bleach catalyst a transition metal complex of a macropolycyclic rigid ligand. The amount used is a catalytically effective amount, suitably about 1 ppb or more, for example up to about 99.9%, more typically about 0.001 ppm or more, preferably from about 0.05 ppm to about 500 ppm (wherein "ppb" denotes parts per billion by weight and "ppm" denotes parts per million by weight).

Transition metal bleach catalysts of Macrocyclic Rigid Ligands which are suitable for use in the invention compositions can in general include known compounds where they conform with the definition herein, as well as, more preferably, any of a large number of novel compounds expressly designed for the present laundry or laundry uses, and non-limitingly illustrated by any of the following:

Dichloro-5,12-dimethyl-1,5,8,12-tetraazabicyclo[6.6.2] hexadecane Manganese(II)

Dichloro-5,12-diethyl-1,5,8,12-tetraazabicyclo[6.6.2] hexadecane Manganese(II)

Dichloro-4,11-dimethyl-1,4,8,11-tetraazabicylclo[6.6.2] hexadecane Manganese(II)

Dichloro-4,11-diethyl-1,4,8,11-tetraazabicyclo[6.6.2] hexadecane Manganese(II)

Diaquo-5,12-dimethyl-1,5,8,12-tetraazabicyclo[6.6.2] hexadecane Manganese(II) Hexafluorophosphate Aquo-hydroxy-5,12-dimethyl-1,5,8,12-tetraazabicyclo [6.6.2]hexadecane Manganese(III) Hexafluorophosphate Diaquo-5,12-dimethyl-1,5,8,12-tetraazabicyclo[6.6.2] hexadecane Manganese(II) Tetrafluoroborate Dichloro-5,12-dimethyl-1,5,8,12-tetraazabicyclo[6.6.2] hexadecane Manganese(III) Hexafluorophosphate Dichloro-5,12-di-n-butyl-1,5,8,12-tetraazabicyclo[6.6.2] hexadecane Manganese(II)

Dichloro-5,12-dibenzyl-1,5,8,12-tetraazabicyclo[6.6.2] hexadecane Manganese(II)

Dichloro-5-n-butyl-12-methyl-1,5,8,12-tetraaza-bicyclo [6.6.2]hexadecane Manganese(II)

Dichloro-5-n-octyl-12-methyl-1,5,8,12-tetraaza-bicyclo [6.6.2]hexadecane Manganese(II)

Dichloro-5-n-butyl-12-methyl-1,5,8,12-tetraaza-bicyclo [6.6.2]hexadecane Manganese(II).

As a practical matter, and not by way of limitation, the compositions and laundry processes herein can be adjusted to provide on the order of at least one part per hundred million of the active bleach catalyst species in the aqueous washing medium, and will preferably provide from about 0.01 ppm to about 25 ppm, more preferably from about 0.05 ppm to about 10 ppm, and most preferably from about 0.1 ppm to about 5 ppm, of the bleach catalyst species in the wash liquor. In order to obtain such levels in the wash liquor of an automatic washing process, typical compositions herein will comprise from about 0.0005% to about 0.2%, more preferably from about 0.004% to about 0.08%, of bleach catalyst, especially manganese or cobalt catalysts, by weight of the bleaching compositions.

(d) Other Bleach Catalysts—The compositions herein may comprise one or more other bleach catalysts. Preferred bleach catalysts are zwitterionic bleach catalysts, which are described in U.S. Pat. No. 5,576,282 (especially 3-(3,4-dihydroisoquinolinium) propane sulfonate. Other bleach catalysts include cationic bleach catalysts are described in U.S. Pat. Nos. 5,360,569, 5,442,066, 5,478,357, 5,370,826, 5,482,515, 5,550,256, and WO 95/13351, WO 95/13352, and WO 95/13353.

(e) Bleach Boosting Compounds—The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness.

Suitable bleach boosting compounds for use in accordance with the present invention comprise cationic imines, zwitterionic imines, anionic imines and/or polyionic imines having a net charge of from about +3 to about –3, and mixtures thereof. These imine bleach boosting compounds of the present invention include those of the general structure:

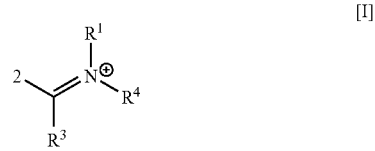

[I]

where $R^1$–$R^4$ may be a hydrogen or an unsubstituted or substituted radical selected from the group consisting of phenyl, aryl, heterocyclic ring, alkyl and cycloalkyl radicals.

Preferred bleach boosting compounds include where $R^1$–$R^4$ may be a hydrogen or an unsubstituted or substituted radical selected from the group consisting of phenyl, aryl, heterocyclic ring, alkyl and cycloalkyl radicals except that at least one of $R^1$–$R^4$ contains an anionically charged moiety.

More preferred bleach boosting compounds include the anionically charged moiety bonded to the imine nitrogen. Such bleach boosting compounds comprise quaternary imine zwitterions represented by the formula:

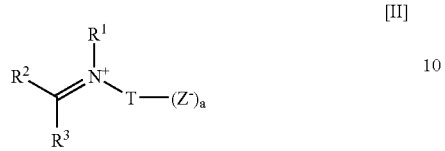

[II]

wherein $R^1$–$R^3$ is hydrogen or an unsubstituted or substituted radical selected from the group consisting of phenyl, aryl, heterocyclic ring, alkyl and cycloalkyl radicals; $R_1$ and $R_2$ form part of a common ring; T has the formula:

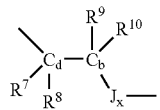

wherein x is equal to 0 or 1; J, when present, is selected from the group consisting of —$CR^{11}R^{12}$—, —$CR^{11}R^{12}CR^{13}R^{14}$—, and —$CR^{11}R^{12}CR^{13}R^{14}CR^{15}R^{16}$—; $R^7$–$R^{16}$ are individually selected from the group consisting of H, linear or branched $C_1$–$C_{18}$ substituted or unsubstituted alkyl, alkylene, oxyalkylene, aryl, substituted aryl, substituted arylcarbonyl groups and amide groups; Z is covalently bonded to $J_x$ when x is 1 and to $C_b$ when x is 0, and Z is selected from the group consisting of —$CO_2^-$, —$SO_3^-$ and —$OSO_3^-$ and a is 1, $R_1$ and $R_2$ together may form the non-charged moiety:

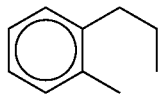

Most preferred bleach boosting compounds include are aryliminium zwitterions wherein $R_3$ is H, Z is —$SO_3^-$ or —$OSO_3^-$, and a is 1. The aryliminium zwitterions may have the formula:

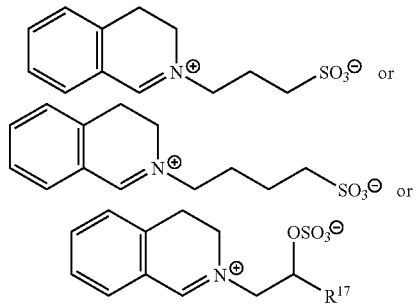

where $R^{17}$ is selected from the group consisting of H and linear or branched $C_1$–$C_{18}$ substituted or unsubstituted alkyl, preferably $C_1$–$C_{14}$ alkyl and even more preferably $C_8$–$C_{10}$ linear alkyl chain.

The bleach boosting compounds may also comprise an aryliminum polyion having a net negative charge and $R^3$ is H, T is —$(CH_2)_b$— or —$CH_2(C_6H_4)$—, Z is —$SO_3^-$, a is 2 and b is from 2 to 4. The aryliminium polyion preferably has the formula:

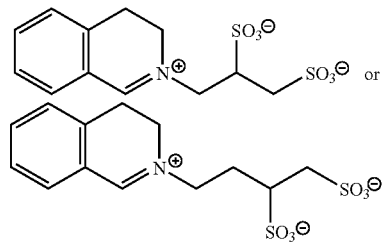

or is a water-soluble salt of these compounds.

The quaternary imine bleach boosting compounds preferably act in conjunction with a peroxygen source to provide a more effective bleaching system. The bleach boosting compounds react with the peroxygen source to form a more active bleaching species, an oxaziridinium compound. The formed oxaziridinium compounds are either cationic, zwitterionic or polyionic with a net negative charge as was the imine bleach boosting compound. The oxaziridinium compound has an increased activity at lower temperatures relative to the peroxygen compound. The oxaziridinium compound is represented by the formula:

(III)

and can be produced from the imine of formula (I) or (II), wherein $R^4$ is T—$(Z^-)_a$, of the present invention with the reaction:

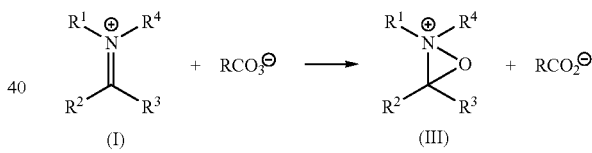

Thus, the preferred bleach boosting compounds of the present invention represented by the formula (II) produces the active oxaziridinium bleaching species represented by the formula:

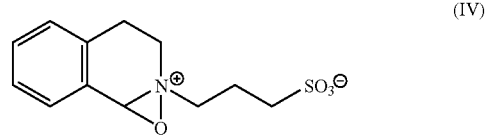

(IV)

or

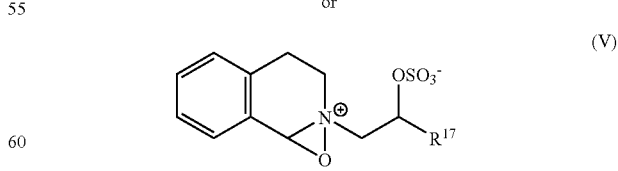

(V)

wherein $R^{17}$ is defined as above.

Peroxygen sources are well-known in the art and the peroxygen source employed in the present invention may comprise any of these well known sources, including peroxygen compounds as well as compounds which under consumer use conditions provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention.

The bleach boosting compounds, when present, are preferably employed in conjunction with a peroxygen source in the bleaching compositions of the present invention. In such a composition, the peroxygen source is preferably present at a level of from about 0.1% to about 60% by weight of the composition, and more preferably from about 1% to about 40% by weight of the composition. In the composition, the bleach boosting compound is preferably present at a level of from about 0.01% to about 10% by weight of the composition, and more preferably from about 0.05% to about 5% by weight of the composition.

(f) Preformed Peracids—Also suitable as bleaching agents are preformed peracids, such as phthalimido-peroxycaproic acid ("PAP"). See for example U.S. Pat. Nos. 5,487,818, 5,310,934, 5,246,620, 5,279,757 and 5,132,431.

Methods of Fabric Care

Fabrics, preferably sulfur-dyed finished garments and/or sulfur-dyed textiles, can be treated with the sulfur dye protection system-containing fabric care compositions by any method known in the art that accomplishes contacting the fabric with the sulfur dye protection system-containing fabric care composition.

A preferred embodiment of the present invention is a method for fabric care a fabric in need of treatment, wherein the method comprises contacting the fabric with an effective amount of sulfur dye protection system-containing fabric care composition such that the fabric care composition treats the fabric.

Preferably, the sulfur dye protection system fabric care composition is in contact with the fabric for an "effective amount of time", which herein means the amount of time required for the sulfur dye protection system-containing fabric care composition to adequately treat a fabric such that the fabric acquires improved color appearance and/or pill prevention and/or abrasion resistance and/or wrinkle resistance and/or shrinkage resistance properties. Such time can vary quite widely, however, a preferred range of time is from about 5 minutes to about 180 minutes, more preferably from about 10 minutes to about 30 minutes.

Suitable methods include, but are not limited to, washing the fabric in a solution containing the sulfur dye protection system-containing fabric care composition. The washing can be manual or automatic, such as in a washing machine. The washing machine used in the method described herein can be any conventional washing machine known in the art. In addition, it can be a specially designed washing machine such as the washing machine described in U.S. Pat. No. 5,520,025 to Joo et al.

Other suitable methods include, but are not limited to, soaking the fabric in a solution containing the sulfur dye protection system-containing fabric care composition; spraying the fabric with a solution containing the sulfur dye protection system-containing fabric care composition; rubbing the fabric with a solid containing the sulfur dye protection system-containing fabric care composition; dipping the fabric in a solution containing the sulfur dye protection system-containing fabric care composition; rolling the sulfur dye protection system-containing fabric care composition onto the fabric, spreading the sulfur dye protection system-containing fabric care composition onto the fabric and brushing the sulfur dye protection system-containing fabric care composition onto the fabric.

In addition to the methods for fabric care fabrics in need of treatment and other surfaces, described herein, the invention herein also encompasses a laundering pretreatment process for fabrics which have been soiled or stained comprising directly contacting said stains and/or soils with a highly concentrated form of the sulfur dye protection system-containing fabric care composition, in any form, preferably a concentrated liquid (preferably in a spray dispenser or roll-on device), stick or bar, set forth above prior to washing such fabrics using conventional aqueous washing solutions. Preferably, the cleaning composition remains in contact with the soil/stain for a period of from about 30 seconds to 24 hours prior to washing the pretreated soiled/stained substrate in conventional manner. More preferably, pretreatment times will range from about 1 to 180 minutes.

Such methods can be used in industrial applications, such as in the textile industry, or in residential (domestic) applications, preferably, the methods are used in the residential (domestic) applications.

Further, these methods can be used independently of one another, or can be combined, concurrently or sequentially.

The use of the fabric care compositions of the present invention in accordance with these methods maintains the color appearance of a dyed fabric in need of treatment, preferably through multiple wash cycles which include bleaching agents, especially activated oxygen bleaches and/or oxygen bleaches.

Product/Instructions

The present invention also encompasses the inclusion of instructions on the use of the sulfur dye protection system-containing fabric care compositions with the packages containing the fabric care compositions herein or with other forms of advertising associated with the sale or use of the fabric care compositions. The instructions may be included in any manner typically used by consumer product manufacturing or supply companies. Examples include providing instructions on a label attached to the container holding the composition; on a sheet either attached to the container or accompanying it when purchased; or in advertisements, demonstrations, and/or other written or oral instructions which may be connected to the purchase of the fabric care compositions.

The instructions, for instance, may include information relating to the temperature of the wash water; washing time; recommended settings on the washing machine; recommended amount of the fabric care composition to use; pre-soaking procedures; and spray-treatment procedures.

Alternatively, the instructions, for instance, may include information relating to finishing baths and/or dye baths used in textile mills, the temperature of such baths, the ingredients of such baths, and/or the rinsing procedures associated with such baths.

A product comprising a sulfur dye protection system-containing fabric care composition, the product further including instructions for using the fabric care composition to treat a fabric in need of treatment, the instructions including the step of: contacting said fabric with an effective amount of said fabric care composition for an effective amount of time such that said composition treats said fabric.

The product may be a laundry detergent composition, a fabric care composition, a fabric conditioner, a finishing composition and/or a dyeing composition. Furthermore, the product may be contained in a spray dispenser.

Processes for Modifying/Making Sulfur Dyes
a. Modification of Sulfur Dyes

In one preferred embodiment of the present invention, a process for making sulfur dyes, especially bleach stable sulfur dyes, comprises the step of: modifying a sulfur dye in need of modification such that the modified sulfur dye exhibits increased bleach stability as compared to the unmodified sulfur dye is provided.

In such a process, conventional sulfur dyes, such as sulfur dyes that are commercially available and/or sulfur dyes made by any conventional, known method, can be modified, preferably chemically modified, such that the modified sulfur dye exhibits increased bleach stability as compared to the unmodified sulfur dye.

The modifying step of the process preferably comprises reacting the unmodified sulfur dye with a stabilizing agent, preferably a source of one or more metal ions, preferably from about 0.1% to about 20%, more preferably from about 0.5% to about 10% by weight of the unmodified sulfur dye of the source of one or more metal ions. Without wishing to be bound by theory, it is believed that the one or more metal ions complexes with the sulfur-containing moiety, preferably the disulfide bond, of the unmodified sulfur dye. This modifying step may take place on free sulfur dye (not adsorbed onto and/or absorbed into textiles) or on sulfur dye adsorbed onto and/or absorbed into textiles.

The one or more metal ions preferably comprise an electron configuration such that the one or more metal ions is at its most stable oxidation state. In other words, the metal ions cannot be oxidized by bleaching agents during textile processing and/or laundering.

The one or more metal ions preferably comprise lanthanide metal ions, more preferably lanthanide metal ions selected from the group consisting of: La(III), Ce(IV), Gd(III) and mixtures thereof.

Alternatively, the one or more metal ions may comprise a transition metal ion, preferably a transition metal ion selected from the group consisting of: Ni(II), Co(II), Pd(II), Pt(II), Sn(IV), Pb(II), Hg(II) and mixtures thereof.

Nonlimiting examples of sources of the one or more metal ions are lanthanide metal salts, such as lanthanum (III) sulfate, cerium (IV) sulfate and gadolinium (III) sulfate, chloride and transition metal salts.

b. Forming Sulfur Dyes, Especially Bleach Stable Sulfur Dyes,

In another preferred embodiment of the present invention, a process for making sulfur dyes, especially bleach stable sulfur dyes, (sulfur dyes comprising "built-in" bleach stability) comprises the steps of:
  a. making a sulfur dye by reacting one or more organic compounds with a sulfur-containing compound to form the sulfur dye; and
  b. reacting the sulfur dye formed in step (a) with one or more stabilizing agents, preferably a source of one or more metal ions, preferably from about 0.1% to about 20%, more preferably from about 0.5% to about 10% by weight of the unmodified sulfur dye of the source of one or more metal ions, such that the sulfur dye exhibits increased bleach stability as compared to the sulfur dye in the absence of such stabilizing agents is provided.

Without wishing to be bound by theory, it is believed that the one or more metal ions complexes with the sulfur-containing moiety, preferably the disulfide bond, of the unmodified sulfur dye.

The one or more organic compounds preferably comprises one or more organic aromatic compounds. These organic aromatic compounds are preferably selected from the group consisting of: suitable organic aromatic compounds known to those of ordinary skill in the art of sulfur dyes and mixtures thereof, and more preferably are selected from the group consisting of: aromatic amines, phenols, or nitro compounds and mixtures thereof.

The one or more organic aromatic compound preferably produce a color selected from the group consisting of: black, brown, yellow, orange, red, blue, green and shades thereof and mixtures thereof.

The step of making the sulfur dye preferably comprises melting or boiling the one or more organic compounds with the sulfur-containing compound.

The sulfur-containing compound preferably comprises a bond selected from the group consisting of sulfide bonds, disulfide bonds, multi-sulfide bonds and mixtures thereof. More preferably the sulfur-containing compound comprises a disulfide bond.

The sulfur-containing compound may be selected from the group consisting of: sulfur, sulfide, and other suitable sulfur-containing compounds known to those of ordinary skill in the art of sulfur dyes, and mixtures thereof. Preferably the sulfur-containing compound is selected from the group consisting of: sulfur, sodium sulfide and mixtures thereof.

The one or more metal ions preferably comprises an electron configuration such that the one or more metal ions is at its most stable oxidation state. In other words, the metal ions cannot be oxidized by bleaching agents during textile processing and/or laundering The one or more metal ions preferably comprise lanthanide metal ions, more preferably lanthanide metal ions selected from the group consisting of: La(III), Ce(IV), Gd(III) and mixtures thereof.

Alternatively, the one or more metal ions may comprise a transition metal ion, preferably a transition metal ion selected from the group consisting of: Ni(II), Co(II), Pd(II), Pt(II), Sn(IV), Pb(II), Hg(II) and mixtures thereof.

Nonlimiting examples of sources of the one or more metal ions are lanthanide metal salts, such as lanthanum (III) sulfate, cerium (IV) sulfate and gadolinium (III) sulfate, chloride and transition metal salts.

Measuring Bleach Stability

The sulfur dyes, especially bleach stable sulfur dyes, of the present invention can be measured for bleach stability according to the following procedure, which is described is a proposed AATCC Method titled "Colorfastness to Home Laundering with Activated Oxygen Bleach Detergent: Accelerated". Accordingly, the determination of whether a sulfur dye, either a modified sulfur dye, or a sulfur dye with a "built-in" bleach stability feature, falls within the scope of the present invention is achieved by following the Protocol set forth below.

Protocol

Step 1—Equipment Preparation

Adjust a laundering machine, a LAUNDEROMETER® commercially available from Atlas Electric Devices Co. 4114 N. Ravenswood Ave., Chicago, Ill. 60613 to maintain 20+/−2° C. The laundering machine is capable of rotating closed canisters in a thermostactically controlled (+/−2° C. of prescribed temperature) water bath at 40+/−2 rpm. The canisters are stainless steel lever lock canisters 550+/−50 ml, 75×125 mm. For heavy weight fabrics, stainless steel lever lock canisters 1200 ml, 90×200 mm may be used.

Step 2—Preparation of Detergent Solution

A minimum of 1 L detergent solution should be prepared and freshly made 30 minutes prior to testing for each laundering run. Prepare the wash liquor by dissolving 10 g of the 1993 AATCC Standard Reference Detergent WOB (without fluorescent whitening agents and without phosphate) powder, available from AATCC, P.O. Box 12215, Research Triangle Park, N.C. 27709, plus 4 g bleach activator (NOBS) and 3 g sodium perborate monohydrate (PB1) per liter of distilled or deionized water of not more than 15 ppm hardness. Preheat this solution to 20+/−2° C.

Step 3—Mixing of Detergent Solution

Disperse vigorously the detergent solution from Step 2 using the mixer in distilled or deionized water of not more than 15 ppm hardness at 20+/−2° C. and stir for 10+/−1 minutes.

Step 4—Prepare Fabric Specimens

The size of the fabric specimens is as follows: 50 mm×100 mm pieces of textiles. Yarn may be knit on an appropriate sample knitting machine. Keep one knitted specimen for each sample as an unwashed original.

Determine the mass, in g, of each specimen using a balance accurate to +/−0.01 g. Three replicates are advised for improved precision. Replicates should be tested in separate cycles.

The fabric specimens are dyed with sulfur dyes. The control fabric specimens are dyed with a conventional, unmodified sulfur dye, such as a commercially available sulfur dye. The test fabric specimens are dyed with the unmodified sulfur dye as modified or formed with the "built-in" bleach stability component in accordance with the present invention. Steps 5–9 are conducted for both the control fabric specimens and the test fabric specimens.

Step 5—Filling Canisters

Add to each laundering device canister the appropriate volume of wash liquor from Step 3 to provide a wash liquor:specimen ratio of 100 ml of wash liquor:1 g of fabric. (Note: Test one specimen per laundering device canister).

Step 6—Preheating Canisters

The filled canisters from Step 5 are preheated to the test temperature by one or two ways: 1) by use of the laundering machine or 2) by use of a preheater/storage unit.

If canisters are to be preheated by use of a preheater/storage unit, place the canisters in a preheater module at 20+/−2° C. for at least 2 min.

If canisters are to be preheated in the laundering machine go to Step 8.

Step 7—Add Specimen to Canisters

After preheating canisters to 20+/−2° C., add a control or test fabric specimen from Step 4 into each canister. Then clamp the covers on the canisters. A TEFLON® fluorocarbon gasket commercially available from DuPont Co. Wilmington, Del. 19898 may be inserted between the neoprene gasket and the top of each canister to prevent contamination of the wash solution by the neoprene.

Step 8—Placing Canisters in Laundering Machine

Fasten the canisters in the adapters on the rotor of the laundering machine. Place an equal number of canisters on each side of the shaft.

For canisters preheated in the laundering machine, start the rotor and run it for at least 2 min. to preheat the canisters. Stop the rotor and with a row of canisters in an upright position, unclamp the cover of one canister, enter a test specimen into the solution and replace the cover, but do not clamp it. Repeat this operation until all the canisters in the row have been loaded. Then clamp the covers in the same order in which the canisters were loaded (delay clamping the covers to allow equalization of pressure). Repeat this operation until all rows of canisters have been loaded.

Check that the solution in the canisters is at the initial temperature (20+/−2° C. Close the canisters and commence rotation.

Increase the temperature at a maximum of 2° C./minute to 60° C. and continue to run for a further 30 minutes at 60° C.

Stop the machine, remove the canisters and empty the contents into 4L beakers half filled with distilled or deionized water of not more than 15 ppm hardness, keeping each test specimen in a separate beaker. Gently agitate and rinse for 1 minute and then place the beaker under a cold running tap for 10 minutes.

Squeeze the fabric specimen by hand to remove the excess water.

Dry the fabric specimen by pressing flat between filter papers to remove excess water. Then hang it in air at a temperature not exceeding 60° C.

Step 9—Preparing Fabric Specimens for Evaluation

Prepare fabric specimens for evaluation by trimming off raveled yarns and lightly brushing off any loose fiber and yarn on the fabric surfaces. Woven fabrics may be stitched around edges to prevent raveling. Brush pile fabric specimens in required direction to restore them as nearly as possible to the same pile angle as the untreated specimens. Specimens should be smoothed or flattened if they are wrinkled due to washing and/or drying. Specimens may be mounted on cards to facilitate identification and handling in their evaluation. For consistency in backing material, use a white mounting card with tristimulus value of at least 85%. Mounting material must not be visible in the area to be viewed and must not interfere with instrumental assessment of color according to AATCC Evaluation Procedure 7, Instrumental Assessment of the Change in Color of a Test Specimen.

Step 10—Evaluation of Color Change

The color change can be quantitatively determined by measuring the color difference between the control fabric specimen and the test fabric specimen using a suitable calorimeter or spectrophotometer with the appropriate software (see AATCC Evaluation Procedure 7, Instrumental Assessment of the Change in Color of a Test Specimen). Determine the color change for the control fabric specimen ($\Delta E_c$) and the color change for the test fabric specimen ($\Delta E_t$). Then calculate the percent reduction of color change caused by bleaching (RCC) as follows:

$$RCC = \frac{\Delta E_c - \Delta E_t}{\Delta E_c} \times 100\%$$

Bleach stable modified sulfur dyes and/or sulfur dyes having bleach stability properties "built-in" in accordance with the present invention, preferably exhibit an RCC greater than 20%, more preferably greater than 30%, most preferably greater than 40%.

Processes for Dyeing Textiles

The sulfur dyes, especially bleach stable sulfur dyes, of the present invention are suitable for dyeing textiles, especially textiles that potentially or will contact bleaching agents during the effective life of the textile, such as garments and the like.

A preferred embodiment of the present invention comprises a process for dyeing a textile comprising contacting the textile with a bleach stable sulfur dye made by a process in accordance with the present invention.

The dyeing of the textile during this process comprises the conventional, well known steps of sulfur dyeing of textiles; namely, 1) reducing a water-insoluble sulfur dye with a reducing agent, such as sodium sulfide, glucose, or other known reducing agents such that the sulfur dye becomes water-soluble sulfur dye solution, 2) contacting the textile to be dyed with the water-soluble sulfur dye solution, and 3)

oxidizing the water-soluble sulfur dye solution with an oxidizing agent, such as sodium bromate, potassium iodate and the like, such that the water-insoluble sulfur dye is formed on and/or in the textile. Under conventional sulfur dyeing of textiles, care should be taken to not over-oxidize the water-insoluble sulfur dye. However, in light of the fact that the sulfur dyes, especially bleach stable sulfur dyes, of the present invention are being used to dye the textiles in this process, the risks associated with over-oxidizing are significantly reduced or non-existent.

Preferably the textiles to be dyed comprise cotton, rayon, cotton/nylon blend, cotton/polyester blend and mixtures thereof.

Sulfur Dyed Textiles

The processes for dyeing textiles with the sulfur dyes, especially bleach stable sulfur dyes, of the present invention result in sulfur dyed textile articles, especially bleach stable sulfur dyed textile articles. These sulfur dyed textile articles are especially useful for incorporation into garments because such garments would resist the loss of the sulfur dyes during laundering of the garments by consumers, especially when the laundering operation includes exposing the garments to bleaching agents, especially oxygen bleaching agents.

The compositions of the present invention can be suitably prepared by any process chosen by the formulator, non-limiting examples of which are described in U.S. Pat. No. 5,691,297 Nassano et al., issued Nov. 11, 1997; U.S. Pat. No. 5,574,005 Welch et al., issued Nov. 12, 1996; U.S. Pat. No. 5,569,645 Dinniwell et al., issued Oct. 29, 1996; U.S. Pat. No. 5,565,422 Del Greco et al., issued Oct. 15, 1996; U.S. Pat. No. 5,516,448 Capeci et al., issued May 14, 1996; U.S. Pat. No. 5,489,392 Capeci et al., issued Feb. 6, 1996; U.S. Pat. No. 5,486,303 Capeci et al., issued Jan. 23, 1996 all of which are incorporated herein by reference.

In addition to the above embodiments, the activated enzymes of the present invention can be formulated into any suitable composition, non-limiting examples of which are described in U.S. Pat. No. 5,679,630 Baeck et al., issued Oct. 21, 1997; U.S. Pat. No. 5,565,145 Watson et al., issued Oct. 15, 1996; U.S. Pat. No. 5,478,489 Fredj et al., issued Dec. 26, 1995; U.S. Pat. No. 5,470,507 Fredj et al., issued Nov. 28, 1995; U.S. Pat. No. 5,466,802 Panandiker et al., issued Nov. 14, 1995; U.S. Pat. No. 5,460,752 Fredj et al., issued Oct. 24, 1995; U.S. Pat. No. 5,458,810 Fredj et al., issued Oct. 17, 1995; U.S. Pat. No. 5,458,809 Fredj et al., issued Oct. 17, 1995; U.S. Pat. No. 5,288,431 Huber et al., issued Feb. 22, 1994 all of which are incorporated herein by reference.

Having described the present invention in detail with reference to preferred embodiments, it will be clear to those skilled in the art that various changes and modifications may be made without departing from the scope of the invention, and the invention is not to be considered limited to what is described in the specification.

What is claimed:

1. A method for improving color fastness of a textile which is dyed with a sulfur dye, comprising the step of contacting said textile with a solution comprising a Lanthanide metal ion during the wash cycle of a laundering operation.

2. A method according to claim 1 wherein said textile is a member selected from the group consisting of fibers, yarns, fabrics, garments, upholstery, drapery and carpets.

3. A method according to claim 2 wherein said textile is a cellulosic textile.

4. A method according to claim 3 wherein said cellulosic textile is a member selected from the group consisting of cotton, rayon, ramie, jute, flax, linen, polycotton and cotton blends.

5. A method according to claim 1 wherein said Lanthanide metal ion is a member selected from the group consisting of La (III), Ce (IV), Gd (III) and mixtures thereof.

6. A method according to claim 2 wherein said Lanthanide metal ion is a member selected from the group consisting of La (III), Ce (IV), Gd (III) and mixtures thereof.

7. A method according to claim 3 wherein said Lanthanide metal ion is a member selected from the group consisting of La (III), Ce (IV), Gd (III) and mixtures thereof.

8. A method according to claim 4 wherein said Lanthanide metal ion is a member selected from the group consisting of La (III), Ce (IV), Gd (III) and mixtures thereof.

9. A method for improving color fastness of a textile which is dyed with a sulfur dye, comprising the step of contacting said textile with a solution comprising a Lanthanide metal ion during the rinse step of a laundering operation.

10. A method according to claim 9 wherein said textile is a member selected from the group consisting of fibers, yarns, fabrics, garments, upholstery, drapery and carpets.

11. A method according to claim 10 wherein said textile is a cellulosic textile.

12. A method according to claim 11 wherein said cellulosic textile is a member selected from the group consisting of cotton, rayon, ramie, jute, flax, linen, polycotton and cotton blends.

13. A method according to claim 9 wherein said Lanthanide metal ion is a member selected from the group consisting of La (III), Ce (IV), Gd (III) and mixtures thereof.

14. A method according to claim 10 wherein said Lanthanide metal ion is a member selected from the group consisting of La (III), Ce (IV), Gd (III) and mixtures thereof.

15. A method according to claim 11 wherein said Lanthanide metal ion is a member selected from the group consisting of La (III), Ce (IV), Gd (III) and mixtures thereof.

16. A method according to claim 12 wherein said Lanthanide metal ion is a member selected from the group consisting of La (III), Ce (IV), Gd (III) and mixtures thereof.

* * * * *